(12) United States Patent
Ghorishi et al.

(10) Patent No.: US 8,092,766 B2
(45) Date of Patent: Jan. 10, 2012

(54) REDOX METHOD FOR CAPTURE OF TOTAL GASEOUS MERCURY BY WET FGD

(75) Inventors: S. Behrooz Ghorishi, Uniontown, OH (US); Luis G. Velazquez-Vargas, Copley, OH (US); Hua Song, Fairlwan, OH (US); Lei Ji, Broadview Heights, OH (US)

(73) Assignee: Babcock & Wilcox Power Generation Group, Inc.

( * ) Notice: Subject to any disclaimer, the term of this patent is extended or adjusted under 35 U.S.C. 154(b) by 53 days.

(21) Appl. No.: 12/837,131

(22) Filed: Jul. 15, 2010

(65) Prior Publication Data

US 2011/0014104 A1    Jan. 20, 2011

Related U.S. Application Data

(60) Provisional application No. 61/226,132, filed on Jul. 16, 2009.

(51) Int. Cl.
*B01D 53/64* (2006.01)
(52) U.S. Cl. ....................................................... 423/210
(58) Field of Classification Search .................. 423/210
See application file for complete search history.

(56) References Cited

U.S. PATENT DOCUMENTS

2001/0043889 A1* 11/2001 Downs et al. ................. 422/168
2011/0027153 A1* 2/2011 Dickson ........................ 423/210

* cited by examiner

*Primary Examiner* — Timothy Vanoy
(74) *Attorney, Agent, or Firm* — Michael J. Seymour; Eric Marich (57) ABSTRACT

A method for capturing gaseous elemental mercury in a flue gas wherein a soluble mercury oxidizer is utilized to oxidize gaseous elemental mercury at a gas-liquid interface of a wet scrubber, and oxidized mercury product is removed prior to re-emission.

20 Claims, 7 Drawing Sheets

FIG. 1

Reaction at the interface:
$Hg^0 + 2M^{n+1} \rightarrow Hg^{+2} + 2 M^n$

REDOX METHOD FOR CAPTURE OF TOTAL GASEOUS MERCURY BY WET FGD

The present application claims benefit of provisional application 61/226,132 filed 16 Jul. 2009, and is hereby incorporated by reference.

FIELD OF THE INVENTION

The present invention relates generally to the field of flue gas treatment, and in particular to a new and useful method for capturing gaseous elemental mercury entrained in the flue gas byproduct of energy generation, combustion, and/or waste energy systems.

Within the flue gas context, mercury may exist in both an oxidized form ($Hg^{+2}$), for example as mercuric chloride ($HgCl_2$), and an elemental form ($Hg^0$), as vaporous metallic mercury. The relative amount of each species depends largely on the type of fuel, type of boiler, combustion efficiency, type of particulate collector installed, and various other factors.

Wet scrubbers are a preferred flue gas desulphurization (FGD) technology due to their high $SO_2$ removal efficiency, low cost, and reliability. Further known is the ability of wet scrubbers to remove mercury, in the oxidized form, from flue gas. Studies have shown that under ideal conditions, wet scrubbers may achieve greater than 50% mercury removal efficiency. Inhibiting greater mercury removal is the inability of wet scrubbers to remove elemental mercury ($Hg^0$), via absorption or another technique, from flue gas. An additional inhibiting factor is the phenomena of re-emission.

While wet scrubbers are capable of capturing soluble oxidized mercury, sulfate species or transition metals present in the scrubber slurry may reduce the oxidized mercury to its elemental form. Elemental mercury is highly insoluble in the scrubber solution and will be emitted to the flue gas. This emission process is also known as mercury re-emission. Previous studies by the Babcock & Wilcox Company (B&W) identified the mercury re-emission mechanism. B&W subsequently developed a novel solution to the mercury re-emission phenomena which includes the addition of sulfide ions to the scrubber slurry. This solution enables sulfide ions to react with oxidized mercury to form an insoluble mercury sulfide (HgS). These and other concepts, described in U.S. Pat. Nos. 6,284,199; 6,328,939; 6,503,470; and 7,037,474, are herein incorporate by reference.

For the purpose of achieving greater mercury removal efficiency, a need exists to remove elemental mercury from flue gas. The present disclosure enables such a method and teaches selectively adding certain metal salts to a scrubbing media will enhance such removal. Thus, in one aspect, the present invention relates to the use of such additives in a Wet FGD scrubber apparatus and a method for capturing and removing elemental mercury from the flue gas. In another aspect the present disclosure enables a cost-effective multi-pollutant emission control system.

A brief description of known mercury removal methodologies that may be applicable for the removal of mercury from flue gas follow below to assist in readily differentiating the present disclosure there from.

Flue Gas Additives

Recent efforts to capture and remove mercury from flue gas have concentrated on the injection of activated carbon into the gas stream. Activated carbon injection does not relate to the present disclosure since it is based on a different capture mechanism. Activated carbons adsorb mercury onto their surface while scrubber slurries absorb mercury into the bulk of the liquid. Adsorption and absorption are two fundamentally different mercury capture mechanisms. Further, injection of activated carbon is not a multi-pollutant control technology, requires significant economic investment to implement, and may inhibit the disposal of combustion products such as fly ash.

Another mercury control technology frequently employed is the injection of gaseous oxidants such as HCl into the flue gas. These gaseous additives oxidize mercury in the gas phase prior entering the scrubber. Oxidized mercury is then captured by Wet FGD scrubbers. Current Wet FGD scrubber technology does not enable the capture of elemental mercury that was not oxidized by the gaseous additive. The elemental form of mercury ($Hg^0$) instead passes through the WFGD scrubber in the vapor form. The present invention solves this problem by enabling a means of oxidizing elemental mercury at the gas-liquid interface within a WFGD scrubber, whereas the prior art seek to oxidize mercury in the gas phase, generally at a point well upstream of a WFGD.

An additional concept is that of mercury oxidation catalysts. In this concept, the catalyst is generally a solid introduced into a flue gas flow and the elemental mercury is oxidized at the gas-solid interface of the catalyst. This approach is similar that previously described, in that these catalysts oxidize elemental mercury in the flue gas prior entering the scrubber and not only lose their effectiveness upon entering a WFGD, but can serve to inhibit the functionality thereof. The present invention solves this problem by introducing a mercury oxidant that does not inhibit the chemistry of a WFGD and further enables a means of oxidizing elemental mercury at the gas-liquid interface within a WFGD scrubber.

Further, these existing flue gas additive techniques require the installation of significant additional hardware and structure prior to a Wet FGD scrubber to implement; thus, increasing the capital cost of controlling mercury emissions. A need for a more practical and economical solution exists.

Scrubber Additives

Concepts relating to the use of insoluble solid sorbents capable of capturing dissolved oxidized mercury from liquids are known. However, these sorbents capture only oxidized mercury and fail to target or feasibly enable the removal of elemental mercury from flue gas. Unlike insoluble sorbents, the present disclosure relates to relates to the injection of certain soluble metal salts which enable the oxidation elemental mercury at the gas-liquid interface within a wet FDG scrubber.

Some known wet FDG additives capable of enhancing elemental mercury removal by their injection into the scrubber slurries are identified in Table 1. Particular examples of such additives are IFS-2C and MBS-2.1 products of Solucorp Industries, Ltd. These additive types, generally characterized as being composed of an alkaline-earth metal sulfide and a redox buffer, are further described in U.S. Patent Application 2005/0244319, herein incorporated by reference.

These additives generally function in similar manner as the introduction of sulfide ions described in B&W's U.S. Pat. No. 6,503,407. These additives when dissolved in a scrubber slurry increase the sulfide ion concentration in the liquid slurry. The sulfide ions then react with the dissolved oxidized mercury ions precipitating mercury as HgS in the manner shown in equation (1) below:

$$Hg^{+2}+S^{-2} \rightarrow HgS\downarrow \tag{1}$$

These additives differ from the present disclosure in that the alkaline-earth metal sulfide additives do not react with vaporous elemental mercury ($Hg^0$) in a manner that enables the removal thereof. The additives instead only react with soluble oxidized mercury, $Hg^{+2}$, and as a consequence, primarily serve only to assist in the capture and precipitation of the already oxidized mercury.

Organic additives such as acrylamines, organo-thiols, or their derivates have also been added to scrubber slurries. The organic compounds interact with elemental mercury directly and act as chelating agents, stabilizing elemental mercury in the scrubber slurries. These additives however do not oxidize mercury; but instead bind with the elemental mercury increasing its solubility and inhibiting its re-emission to the gas phase. In this reaction the organic compound is neutralized and precipitate out of the solution as generally shown in equation (2) below and further described in U.S. Patent Application US2005/0260112, herein incorporated by reference.

$$Hg^0 + R\text{---}SH(\text{organic Thiol}) \rightarrow (R\text{---}HS)\text{---}Hg\downarrow \quad (2)$$

This technology differs from the present invention in that the redox metal oxidizes the $Hg^0$ leaving the $Hg^{+2}$ in the solution, while the organic additives act as chelating agents stabilizing the mercury in its elemental form. These chelating agents have been known to adversely affect the operation of wet scrubbers by removing other metals that are necessary for natural oxidation of the sulfite ions to sulfate thus making their use impractical in Wet FGD scrubbers if effective SOx removal is necessary or otherwise desirable.

Recent studies have also suggested that mercury oxidation may also be achieved in the aqueous phase with or without the presence of oxidants. However, these studies fail to consider a gaseous media, such as flue gas, which comprises $SO_2$, and experimentation conducted has identified that these systems do not show any mercury removal capability in the presence of $SO_2$. The present disclosure readily differs from these techniques in that the additives and methodology disclosed herein oxidize $Hg^0$ in the presence of $SO_2$. Accordingly, a benefit of the present invention is that it can be directly applied to existing wet scrubbers without compromising the $SO_2$ removal performance.

SUMMARY OF THE INVENTION

It is an object of the present invention to provide a system and method for capturing gaseous elemental mercury from a gas containing the gaseous elemental mercury, by adding one or more soluble additives to a wet scrubber system.

A further object of the invention includes providing a system and method for capturing a gaseous elemental mercury from flue gas before it is discharged into the atmosphere that comprises supplying flue gas containing the gaseous elemental mercury to a wet scrubber and adding to the wet scrubber slurry feed line at least one mercury oxidizer for oxidizing the gaseous elemental mercury at a gas-liquid interface within the wet scrubber apparatus to form an oxidized mercury and subsequently removing the oxidized mercury from the wet scrubber system.

A further objective of the present invention to provide a system and method for capturing gaseous elemental mercury from a gas containing the gaseous elemental mercury, by adding one or more soluble additives and a promoter to a wet scrubber system.

A further object of the invention includes providing a system and method for capturing a gaseous elemental mercury from flue gas before it is discharged into the atmosphere that comprises supplying flue gas containing the gaseous elemental mercury to a wet scrubber and adding to the wet scrubber slurry feed line a promoter and at least one mercury oxidizer for oxidizing the gaseous elemental mercury at a gas-liquid interface within the wet scrubber apparatus to form an oxidized mercury and subsequently removing the oxidized mercury from the wet scrubber system.

A further objective of the present invention to provide a system and method for capturing gaseous elemental mercury from a gas containing the gaseous elemental mercury, by adding one or more soluble additives, a promoter, and a complexing agent to a wet scrubber system.

A further object of the invention includes providing a system and method for capturing a gaseous elemental mercury from flue gas before it is discharged into the atmosphere that comprises supplying flue gas containing the gaseous elemental mercury to a wet scrubber and adding to the wet scrubber slurry feed line a promoter, a complexing agent, and at least one mercury oxidizer for oxidizing the gaseous elemental mercury at a gas-liquid interface within the wet scrubber apparatus to form an oxidized mercury and subsequently removing the oxidized mercury from the wet scrubber system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF PREFERRED EMBODIMENTS

When referring to the drawings of the present invention, it shall be understood that like reference numerals are used to refer to the same or similar elements.

The present invention provides a method for capturing and removing elemental mercury from flue gas in wet FGD scrubbers by the reaction of a water-soluble mercury oxidant with elemental mercury at the gas-liquid interface of a wet FDG system, with or without the facilitation of a promoter and/or a complexing agent.

Figure 1:
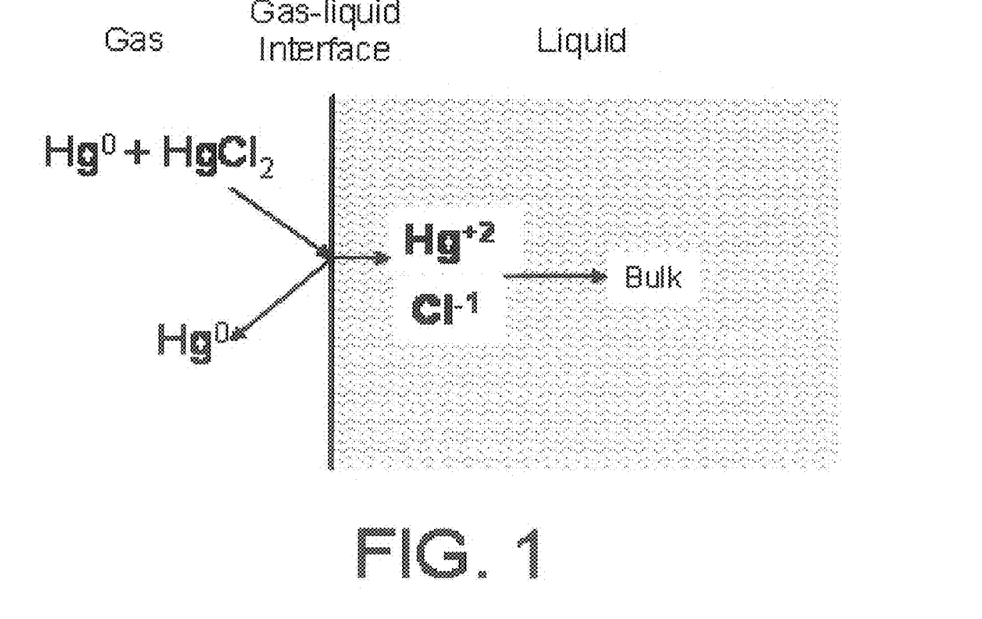
FIG. 1 is a schematic of the absorption mechanism of ionic mercury.

The solubility of oxidized mercury in scrubber slurries is much higher than that of elemental mercury. When the scrubber solution is saturated with elemental mercury, the solution will not retain any more elemental mercury from the gas. Hence, elemental mercury will remain in the gas phase and will be emitted to the atmosphere along with the flue gas. FIG. 1 illustrates the oxidized and elemental mercury capture mechanism in a wet FGD scrubbing system.

Figure 2:
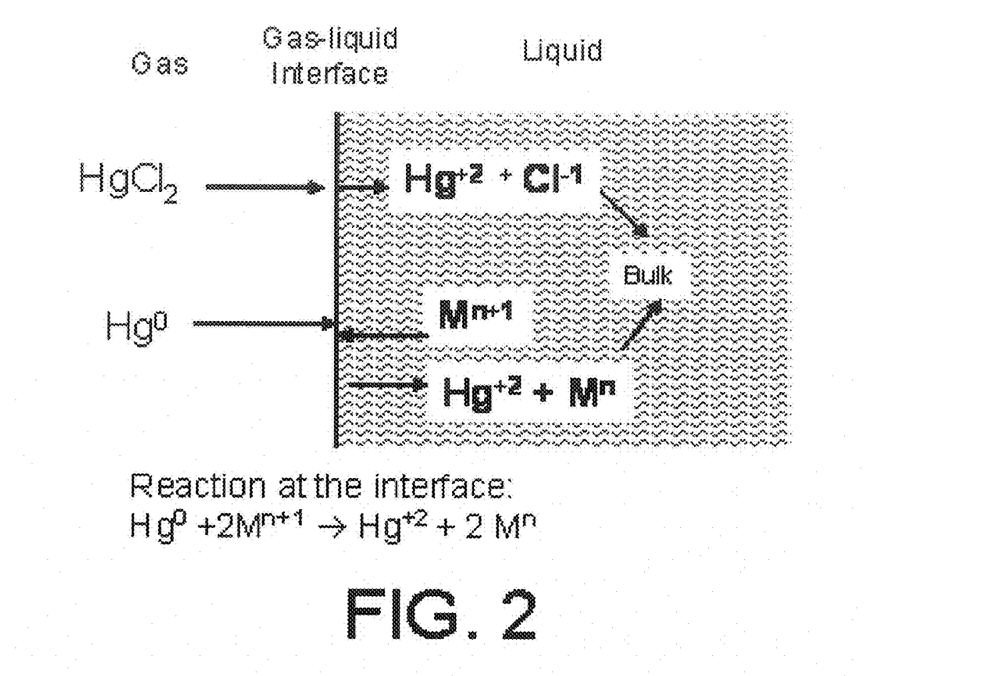
FIG. 2 is a schematic showing the mechanism for enhanced mercury removal by the use of redox reactions according to the present invention.

In order to increase elemental mercury removal according to the present invention, a mercury oxidant capable of oxidizing elemental mercury at the gas-liquid interface, is introduced into the scrubber slurry. In one embodiment the mercury oxidant is preferentially introduced to the slurry along a slurry feed line interposed between the slurry tank and a spray header. The mercury oxidant agent oxidizes the elemental mercury while it is reduced to a lower oxidation state. This redox reaction occurring at the gas liquid interface can be generally described as:

$$Hg^0 + 2M^{n+1} \rightarrow Hg^{+2} + 2M^n \quad (3)$$

where $M^{n+1}$ is an ion than can be reduced by the reaction with elemental mercury. FIG. 2 shows the elemental mercury oxidation mechanism occurring at the gas-liquid interface in wet FGD systems. In one embodiment, a gas liquid interface is readily defined as the area around and between a spray header and a scrubber tray wherein gaseous flue gas and a liquid scrubber slurry dispensed from a spray header interface one another. In another embodiment the gas liquid interface is more broadly defined as any point within a wet FGD system wherein gaseous flue gas and a liquid scrubber slurry interface one another.

The presence of $SO_2$ with relatively high concentration compared to elemental mercury ($Hg^0$) in the flue gas makes the mercury oxidation more complicated, because the oxidation reaction of dissolved $SO_2$ described below occurs more readily than mercury oxidation due to its relatively lower oxidation potential. As a result, any oxidant added into the wet scrubber will be preferentially consumed by the oxidation reaction of sulfite to sulfate before getting an opportunity to react with elemental mercury ($Hg^0$).

$$SO_2 + H_2O \leftrightarrow H_2SO_3 \quad (4)$$

$$H_2SO_3 + H_2O \leftrightarrow SO_4^{2-} + 4H^+ + 2e(E=0.172 \text{ eV}) \quad (5)$$

$$Hg^0 \leftrightarrow Hg^{2+} + 2e(E=-0.851 \text{ eV}) \quad (6)$$

To address this concern, a mercury oxidant with reduction potential greater than about 0.851 eV is first selected to oxidize elemental mercury, $Hg^0$, in the presence of high concentration of $SO_2$. To further facilitate and enable the employed mercury oxidant as selective for Hg oxidation, a promoter system with reduction potential between −0.172 eV and 0.851 eV is preferentially introduced to exclusively act as the oxidizing agent for the sulfite oxidation. The reduced promoter may, after sulfite oxidation, be re-oxidized back to its original oxidation state by the aforementioned oxidant. In this means the promoter may regenerate itself and be available for subsequent cycles.

Figure 3:
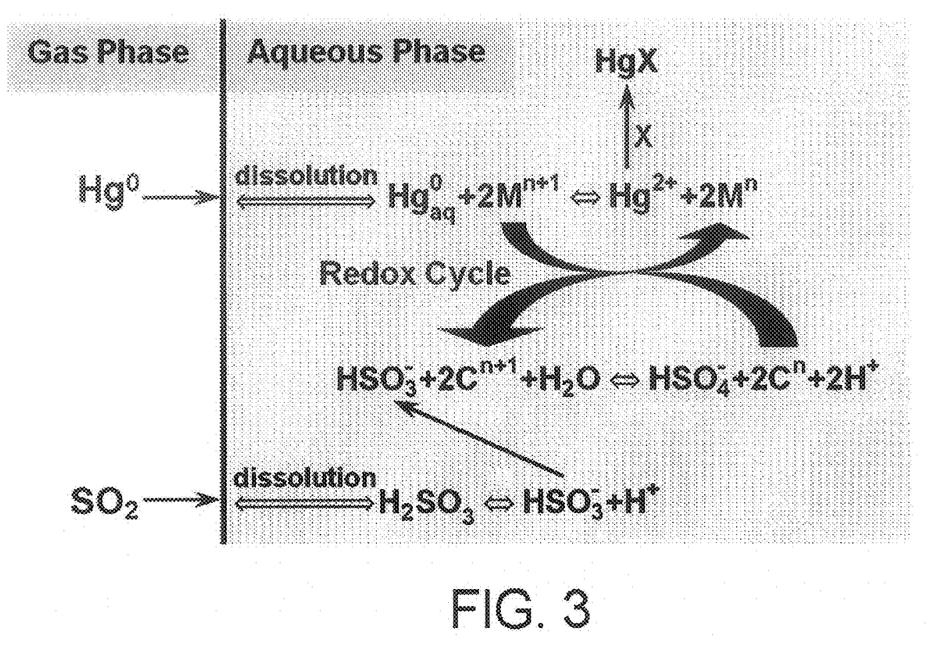
FIG. 3 is a schematic showing of the Hg removal mechanism in the presence of high concentration $SO_2$.

In addition, certain inorganic species, may also be selectively injected, to bonds with the oxidized mercury, thereby shifting the equilibrium of equation (6) towards the oxidation of elemental mercury. Experimental analysis, further described herein, has shown that complexing agents when properly incorporated with the mercury oxidant and the promoter system retain there complexing ability within the oxidative environment of a wet FDG system wherein mercury oxidation takes place. Accordingly, the mercury removal efficiency of the present invention may further be improved when a complexing agent is utilized. FIG. 3 pictorially summarizes mercury removal in the presence of $SO_2$, where 'M' stands for the oxidant, 'C' represents promoter, and 'X' the complexing agent.

Experimental Proof of Concept

Figure 4:
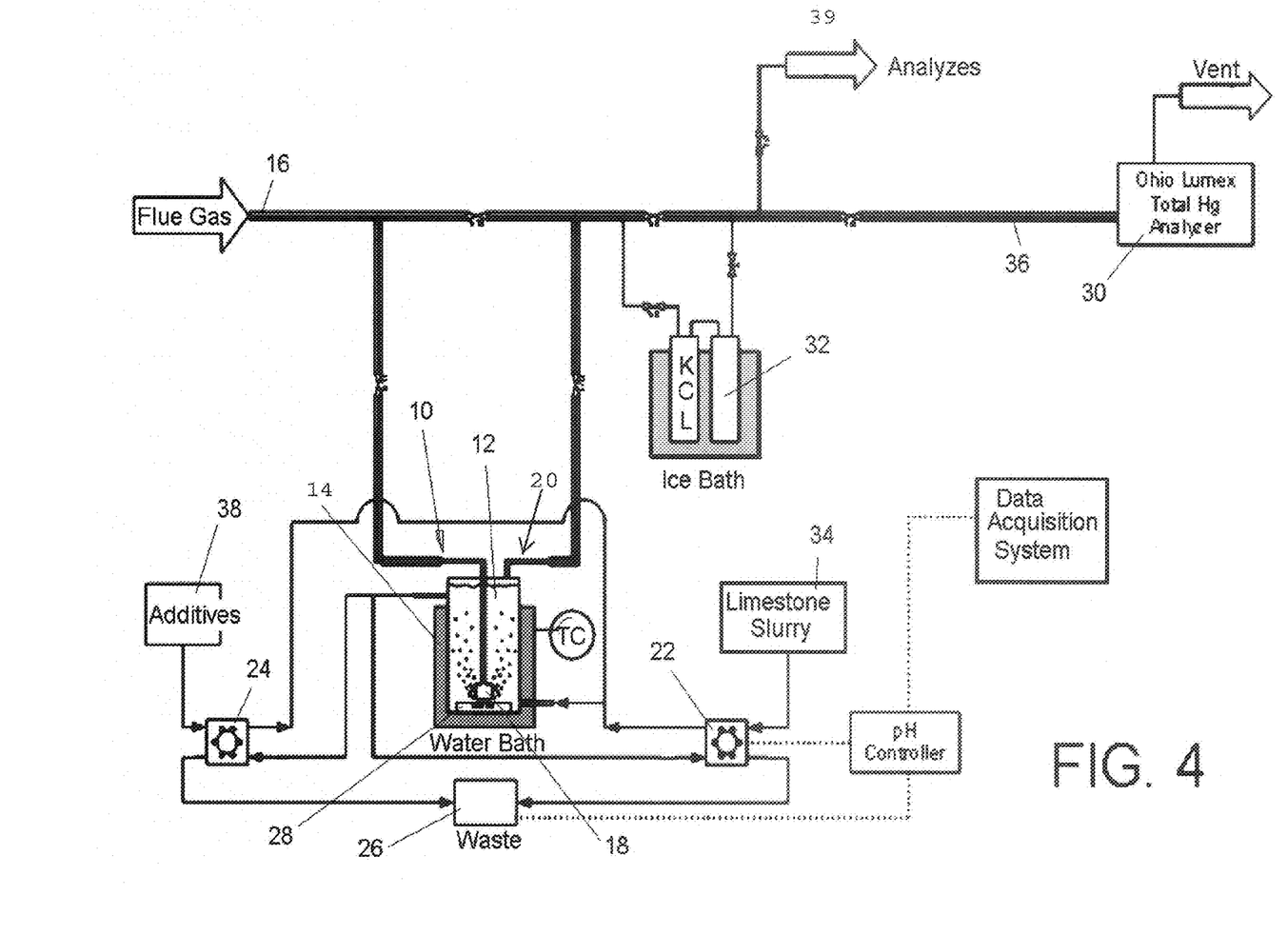
FIG. 4 is a schematic diagram of a laboratory-scale wet scrubber experimental setup for demonstrating the effectiveness of the invention.

FIG. 4 is a schematic diagram of a laboratory scale scrubbing system. The scrubber 10 consists of a glass cell 12 submerged into a temperature controlled water bath 14. The glass cell 12 is designed to work with liquid volumes from about 800 to about 1000 cm³. Simulated flue gas 16 is injected into the scrubber 10 through a glass nozzle 18 having a plurality of orifices of about 1 mm in diameter. The gas exits the scrubber through top outlet port 20.

The simulated flue gas mixture was prepared by mixing pure gases in the proportion identified in Table 1. Elemental mercury was introduced by flowing nitrogen into a chamber containing a standardized mercury permeation tube. The amount of mercury in the gas stream was controlled by changing the temperature of the chamber. The relative amount of each gas was controlled using mass flow controllers. The total gas sent to the scrubber 10 was kept constant at about 4 L/min, unless otherwise noted.

All gas lines are made of TEFLON® and heated to about 300° F. Peristaltic pumps 22 and 24 feed liquid into the scrubber 10 and bring back their portion of slurry from the scrubber into a reservoir 26. This mode of operation ensures a constant slurry level in the scrubber. A magnetic stirrer 28 agitates the scrubber solution. The scrubber generally operates in a continuous stirred tank reactor (CSTR) mode.

TABLE 1

Simulated flue gas composition.

| Gas species | Concentration Range |
| --- | --- |
| $CO_2$ | 13.5-14.5% |
| $O_2$ | 4.5-5.5% |
| $SO_2$ | 900-1100 ppm |
| $NO_x$ | 290-310 ppm |
| $Hg^0$ | 40-70 µg/m³ |
| $N_2$ | Balance |

The mercury concentration in the flue gas was measured using a total mercury analyzer 30 (Ohio Lumex Mini CEM 915). This mercury analyzer is equipped with an external thermal converter and measures total mercury ($Hg^0$ and $Hg^{+2}$). To determine the fraction of $Hg^{+2}$ in the gas, the gas is sent to a potassium chloride scrubber solution 32. This scrubber removes only $Hg^{+2}$ from the gas resulting in a direct measurement of elemental mercury in the flue gas. The amount of $Hg^{+2}$ in the gas can be then calculated by subtracting the amount of elemental mercury, $Hg^0$, from the total mercury measurement. Mercury concentrations were taken at the inlet and outlet of the scrubber. The scrubber mercury removal efficiency is calculated by:

$$\text{Hg Removal Efficiency} = \left(1 - \frac{Hg_{outlet}}{Hg_{inlet}}\right) 100$$

The $CO_2$, $SO_2$ and $NO_X$ concentrations in the flue gas were measured by sending the outlet gas stream 39 to pre-calibrated gas monitors. Similarly to the mercury removal efficiency, the scrubber sulfur removal efficiency is calculated by:

$$\text{SO2 Removal Efficiency} = \left(1 - \frac{SO2_{outlet}}{SO2_{inlet}}\right) 100$$

In an experiment, the scrubber was initially bypassed. The flue gas was then sent to the analyzers to obtain an inlet gas concentration. Once a stable inlet reading was obtained, the flue gas was sent to the scrubber. Simultaneously, a saturated lime solution 34 was sent to the scrubber 10. The lime flow rate was controlled to obtain greater than 90% $SO_2$ removal and pH between about 5.00 and about 6.00. Once the system reach steady state, exit gas measurements were obtained including the Hg concentration in the exit gas stream 36. The additives 38 (inclusive of one or more of mercury oxidant, promoter, and complexing agent) were then dissolved into the scrubber slurry of the wet scrubber at designated concentrations. To secure the stability and reproducibility of the performance data, each experiment lasted at least three hours and selected experiments were repeated.

Experimental Results a) Mercury Oxidants

A mercury oxidant or mercury oxidizing agent is herein defined as a compound capable to change mercury from its elemental to its oxidized form. The Mercury oxidation process can be written in its fundamental form as:

$$Hg^0 \rightarrow Hg^{+2} + 2e^{-1} \quad E = -0.851 \text{ eV}; \tag{7}$$

where $Hg^0$ represents elemental mercury, and $Hg^{+2}$ the oxidized form of Mercury. The standard electrode potential, E, for this reaction is equal to negative 0.851 eV. The negative sign indicates that the reaction does not occur spontaneously; energy needs to be supplied for the reaction to occur. Oxidizers supply this energy. Therefore, an oxidizer, denote here as M, need a standard electrode potential greater than 0.851. The overall oxidation reaction mechanism is shown below. The overall reaction, Equation 10, is the result of the addition of the individual reactions, Equations 8 and 9. As can be seen, Equation 10 has a positive standard electron potential, which means that the oxidation of mercury is thermodynamically favorable.

$$Hg^0 \rightarrow Hg^{+2} + 2e^{-1} \quad E = -0.851 \text{ eV} \tag{8}$$

$$2M^{n+1} + 2e^{-1} \rightarrow 2M^n \quad E > 0.851 \text{ eV} \tag{9}$$

$$Hg^0 + 2M^{n+1} \rightarrow Hg^{+2} + 2M^n \quad E > 0 \text{ eV} \tag{10}$$

Table 2 identifies several mercury oxidants evaluated in the present invention having standard electrode potentials greater than 0.851.

TABLE 2

Mercury oxidizing agents

| Compound | Reaction | Electrode Potential |
|---|---|---|
| $K_2S_2O_8$ | $S_2O_8^{-2} + 2H^{+1} + 2e^{-1} \rightarrow 2HSO_4^{-1}$ | E = 2.123 |
| $Ce(NO_3)_4$ | $Ce^{+4} + e^{-1} \rightarrow Ce^{+3}$ | E = 1.720 |
| $KMnO_4$ | $MnO_4^{-1} + 8H^{+1} + 5e^{-1} \rightarrow Mn^{+2} + 4H_2O$ | E = 1.507 |
| $AuCl_3$ | $Au^{+3} + 3e^{-1} \rightarrow Au$ | E = 1.498 |
| $KClO_3$ | $ClO_3^{-1} + 6H^{+1} + 6e^{-1} \rightarrow Cl^{-1} + 3H_2O$ | E = 1.451 |
| $NaBrO_3$ | $BrO_3^{-1} + 6H^{+1} + 6e^{-1} \rightarrow Br^{-1} + 3H_2O$ | E = 1.423 |
| $Tl(NO_3)_3$ | $Tl^{+3} + 2e^{-1} \rightarrow Tl^{+1}$ | E = 1.252 |
| $K_2Cr_2O_7$ | $Cr_2O_7^{-2} + 14H^{+1} + 6e^{-1} \rightarrow Cr^{+3} + 7H_2O$ | E = 1.232 |
| $IrCl_3$ | $Ir^{+3} + 3e^{-1} \rightarrow Ir$ | E = 1.156 |
| $NaIO_3$ | $IO_3^{-1} + 6H^{+1} + 6e^{-1} \rightarrow I^{-1} + 3H_2O$ | E = 1.085 |
| $HgCl_2$ | $Hg^{+2} + 2e^{-1} \rightarrow Hg^0$ | E = 0.851 |

Figure 5:
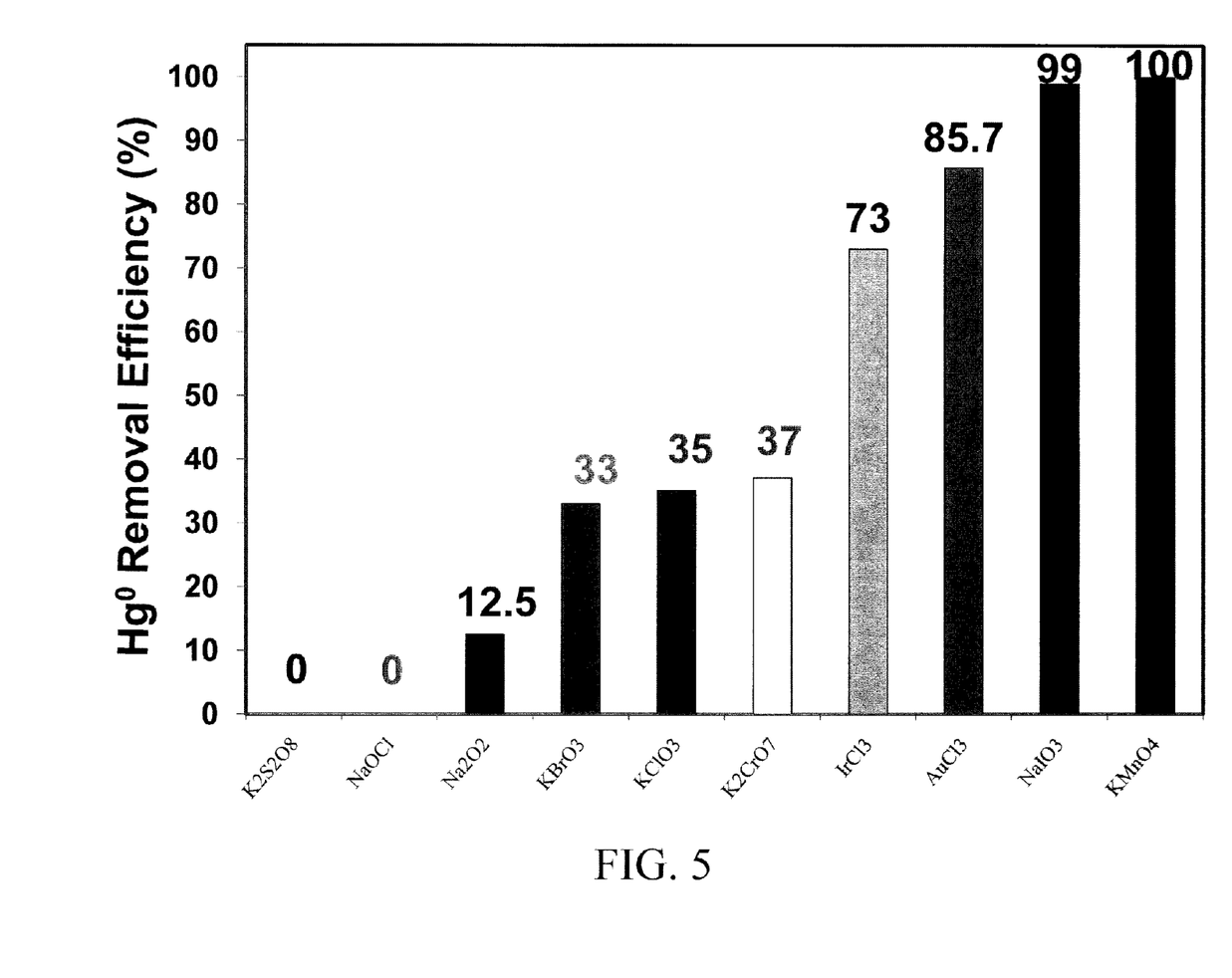
FIG. 5 is a graph showing the effect of various mercury oxidizers on elemental mercury removal.

FIG. 5. summarizes the elemental mercury removal efficiency of various mercury oxidants evaluated. As previously discussed, sulfite ions may also react with the mercury oxidant, and produce a wide range of mercury removal efficiencies. To further explore this relationship, the selective addition of promoter was subsequently evaluated.

b) Promoters

A promoter, denoted in the below equations as C, is a substance that do not oxidize mercury but has sufficient oxidation potential to oxidize sulfite ions to sulfate. The oxidation mechanism of the sulfite ions by a promoter is described below. Equation 12 is the addition of the fundamental reactions shown as Equation 11 and 12.

$$SO_3^{-2} + H_2O \rightarrow SO_4^{-2} + 2H^{+1} + 2e^{-1} \quad E = 0.930 \tag{11}$$

$$C^{n+2} + 2e^{-1} \rightarrow C^n \quad E < 0.851 \tag{12}$$

$$SO_3^{-2} + C^{n+2} + H_2O \rightarrow SO_4^{-2} + 2H^{+1} + C^n \quad E > 0 \tag{13}$$

Promoters minimize the interaction between the oxidants and the sulfites allowing the oxidants to effectively react with mercury. Table 3 below identifies a sampling of potential promoters applicable to the present invention.

TABLE 3

List of promoters

| Promoter | Reaction | Potential |
|---|---|---|
| $AgNO_3$ | $Ag^{+1} + e^{-1} \rightarrow Ag$ | E = 0.799 |
| $FeCl_3$ | $Fe^{+3} + e^{-1} \rightarrow Fe^{+2}$ | E = 0.771 |
| $CuCl_2$ | $Cu^{+2} + 2e^{-1} \rightarrow Cu$ | E = 0.331 |

Figure 6:
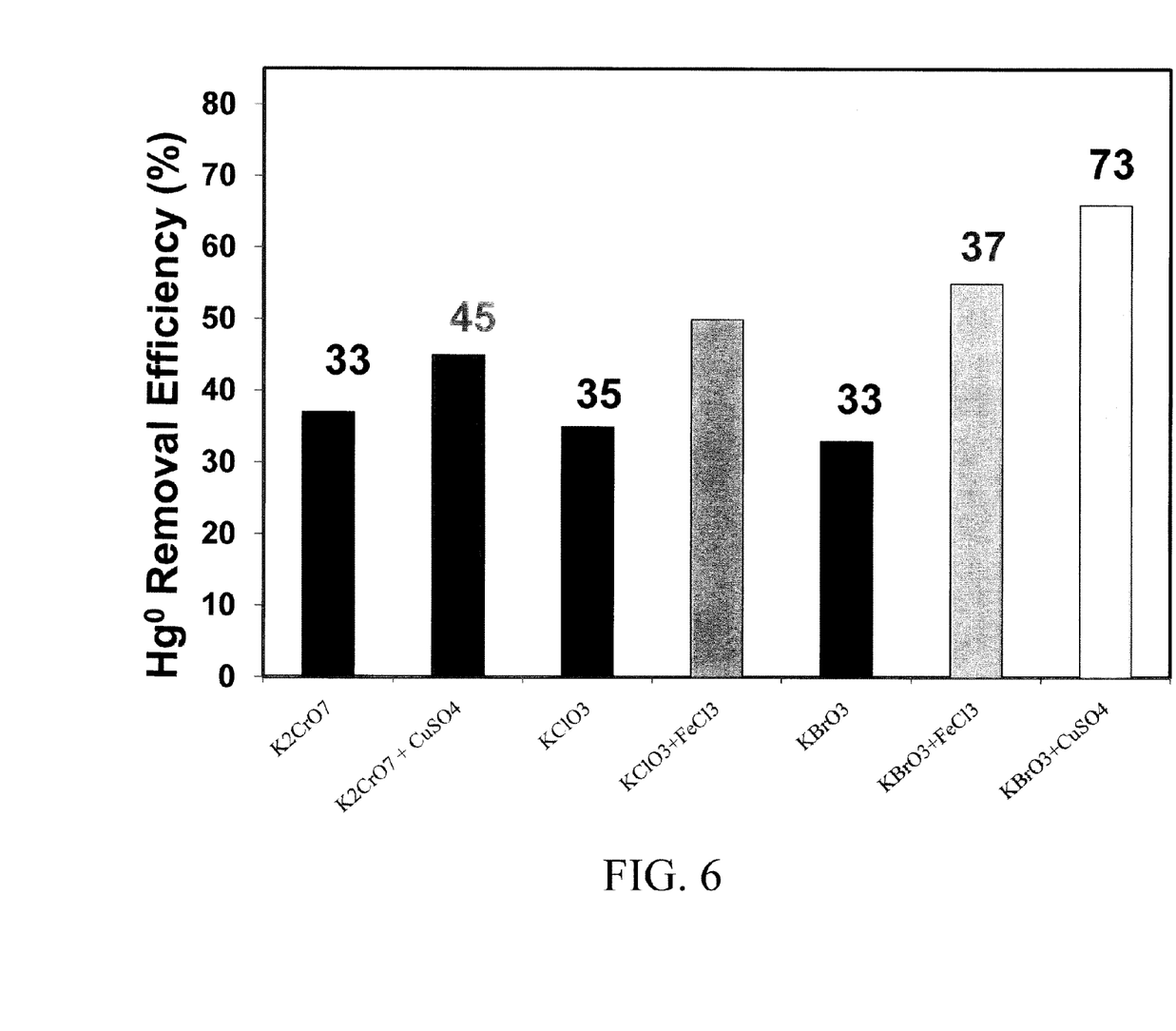
FIG. 6 is a graph showing the effect of a promoter on elemental mercury removal

Experiments were performed to evaluate the effectiveness of these promoters. Experiments were performed by injecting the oxidizing agent both by itself and in combination with a promoter. FIG. 6. is a graphic illustration showing the mercury removal efficiency achieved with these combinations.

c) Complexing Agent

Complexing agents are substances that do not participate in the oxidation of elemental mercury directly, but form complexes with the oxidized mercury. Oxidized mercury in a mercury complex no longer participate in the reaction driving the elemental mercury towards the oxidized state. The action of the complexing agent is described below.

$$Hg^0 + 2M^{n+1} \rightarrow Hg^{+2} + 2M^n \tag{13}$$

$$Hg^{+2} + 4X^{-1} \rightarrow Hg(X)_4^{-2} \tag{14}$$

$$Hg^0 + 2M^{n+1} + 4X^{-1} \rightarrow Hg(X)_4^{-2} + 2M^n \tag{15}$$

Furthermore, when the ionic mercury is found in its complex form, mercury is no longer reduced by the sulfites. Complexing agents hence further reduce Mercury re-emission. Halogens may form complexes with mercury. Table 4 identifies several complexing agents and their redox potential.

TABLE 4

List of complexing agents

| Complexing Agent | Reaction |
|---|---|
| NaI or KI | $Hg^{+2} + 4I^{-1} \rightarrow Hg(I)_4^{-2}$ |
| NaBr or KBr | $Hg^{+2} + 4Br^{-1} \rightarrow Hg(Br)_4^{-2}$ |
| NaCl or KCl | $Hg^{+2} + 4Cl^{-1} \rightarrow Hg(Cl)_4^{-2}$ |
| NaHS | $Hg^{+2} + S^{-2} \rightarrow HgS \downarrow + H^+$ |

Figure 7:
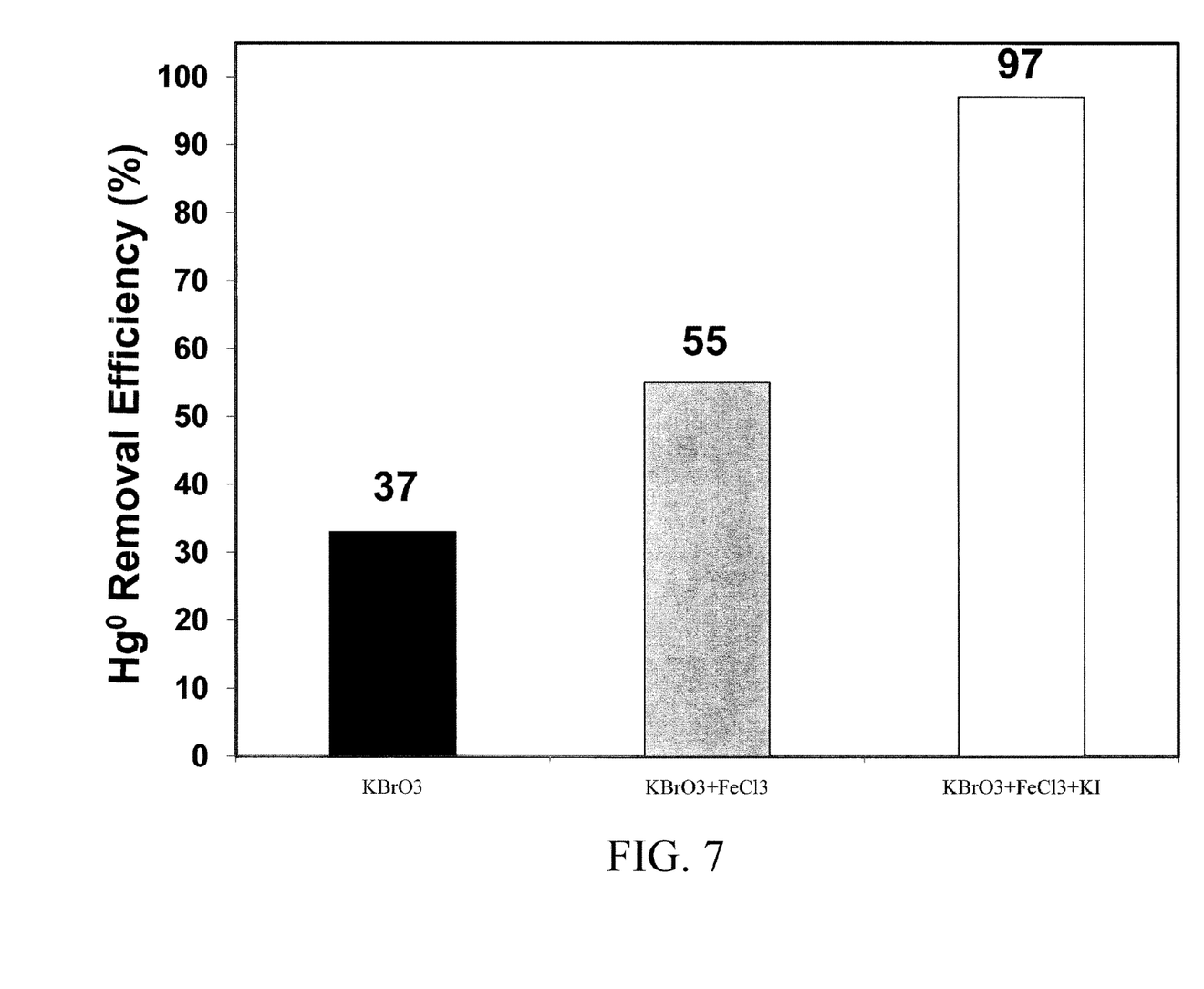
FIG. 7 is a graph showing the effect of a complexing agent on elemental mercury removal.

Experiments were performed to evaluate the effect of introducing a complexing agent into the scrubber. FIG. 7 shows the effect of the complexing agents in the mercury removal efficiency. As can be seen the combination of an oxidizer, promoter and a complexing agent enables mercury removal efficiencies of up to about 97%.

Other combination of the additives selected from aforementioned three categories (oxidant, catalyst, and complexing agent) could also be used in similar manner. Further optimization of the technique can be made by those skilled the art to minimize the addition of these additives for industrial application.

Figure 8:
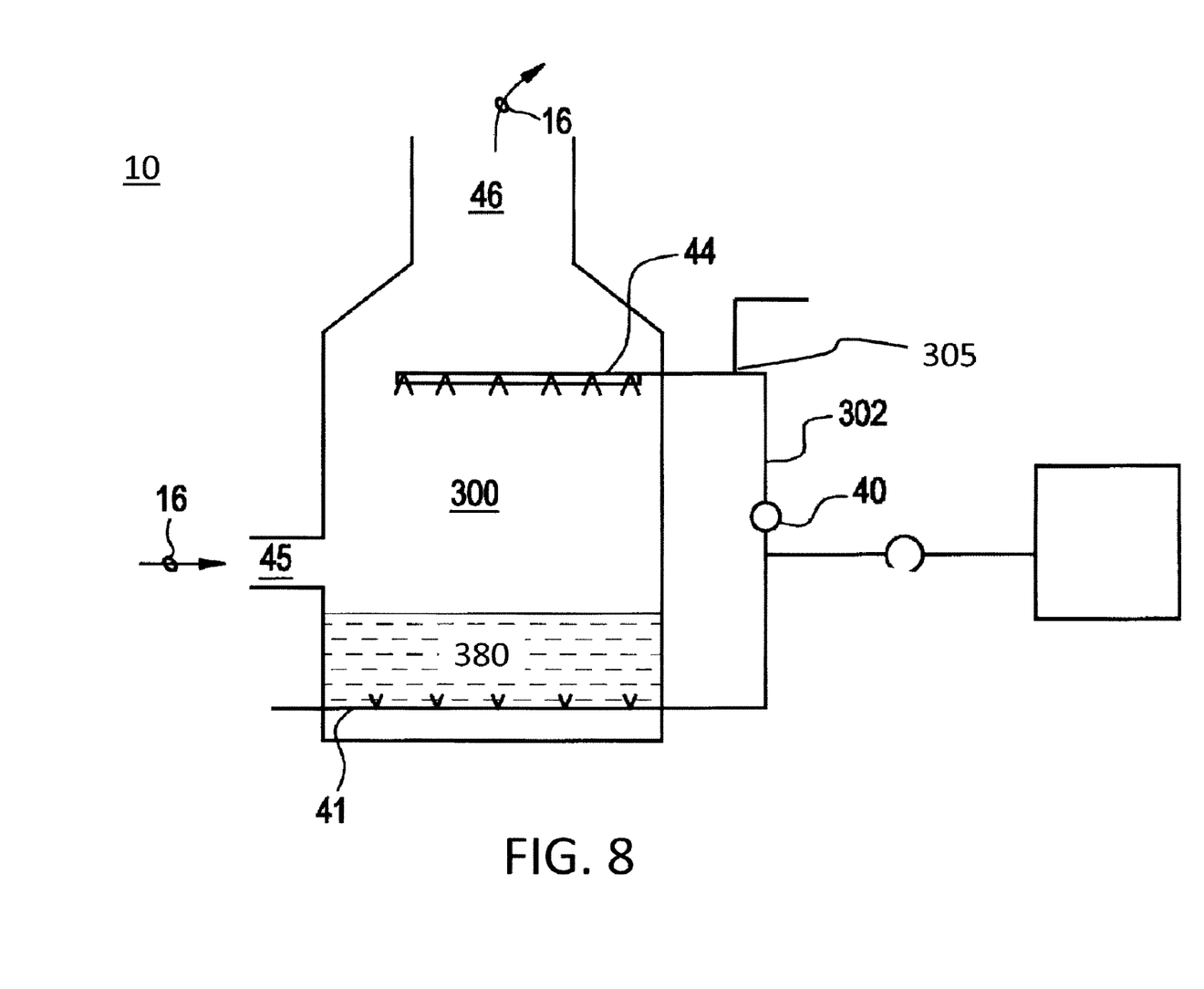
FIG. 8 is a schematic diagram of a wet scrubber.

Referring now to FIG. 8, a schematic diagram of a wet scrubber is shown. Wet scrubber 10 comprises a main chamber 300 with scrubber inlet 45 and scrubber outlet 46. Main chamber 300 has a lower portion containing an inventory of scrubber liquor 380 which recirculates from the main chamber 300 into absorber spray headers 44 by means of general recirculation line 302. General recirculation line 302 may comprise pipes and recirculation pumps 40. Frequently, the lower portion of main chamber 300 containing scrubber liquor 380 will include means for injecting air, such as air sparger 41, into the scrubber slurry 380. The use of air sparger 41 oxidizes the products of $SO_2$ absorption in scrubbing slurry 380. Finally, scrubber slurry 38 may be contained in a bulk storage vessel which forms the lower portion of main chamber 300 (as pictured), or it may comprise a separate holding tank connected to a drain in the main chamber 300 and recirculation line 302.

Attached to recirculation line 302 is an additive injection inlet 305. In a preferred embodiment one or more mercury oxidants, promoters, and complexing agents (i.e., and additive mixture) are introduced into the scrubber system through injection inlet 305 and mix with scrubber slurry within recirculation line 302 prior to discharged through spray headers 44. Upon discharge the additive mixture, a liquid, reacts with the gaseous flue gas at a gas-liquid interface to reduce elemental mercury to an oxidized form. While FIG. 8 depicts one potential injection location, it is understood that the additives may be injected anywhere along recirculation line 302, alternatively directly into spray headers, or otherwise into the slurry holding medium. In an alternative embodiment an independent additive spray header may also be used to spray additives into the scrubber system separate from the absorber spray headers 44.

As can be understood by the skilled artisan the present invention advances the art by providing a novel solution to the removal elemental mercury from a flue gas. Further a significant benefit of the present invention is the ease by which it can be installed on an existing wet FDG system. Unlike other concepts the present inventions does not require the installation of significant structural hardware. It is further believed that the present invention also enable a net power savings as the forced air flow of the bottom of a wet FDG scrubber may be reduced or completely removed. Another additional indirect benefit is the improved removal efficiency of $SO_2$.

While specific embodiments of the invention has been shown and described in detail to illustrate the application of the principles of the invention, it will be understood that the invention may be embodied otherwise without departing from such principles.

We claim:

1. A method for removing elemental mercury from flue gas in wet scrubber comprising the steps of:
   providing a wet scrubber having a scrubber slurry;
   providing a flue gas comprising a $SO_2$, a oxidized mercury, and a elemental mercury;
   enabling the flue gas to pass through the scrubber;
   introducing a mercury oxidizer into the scrubber slurry, and
   oxidizing the elemental mercury with the mercury oxidizer at a gas-liquid interface of the flue gas and the scrubber slurry within the wet scrubber.

2. The method of claim 1 further comprising the step of improving elemental mercury removal by introducing a promoter into the scrubber slurry, wherein the promoter acts as a oxidizing agent for sulfite oxidation.

3. The method of claim 2 further comprising the step of improving elemental mercury removal by introducing a complexing agent into the scrubber slurry, wherein the complexing agent bonds with the elemental mercury once oxidized and inhibits remission in an elemental form.

4. The method of claim 1, wherein the mercury oxidizer has a reduction potential higher than about 0.851 eV.

5. The method of claim 4, wherein the mercury oxidizer is a soluble metal salt that is reduced by the reaction with elemental mercury.

6. The method of claim 2, wherein the promoter introduced into the wet scrubber has a reduction potential between about −0.172 eV and about 0.851 eV.

7. The method of claim 6 further comprising the step of improving elemental mercury removal by introducing a complexing agent into the scrubber slurry, wherein the complexing agent bonds with the elemental mercury once oxidized and inhibits remission in an elemental form.

8. The method of claim 1, wherein the wet scrubber comprise a slurry recirculation line to facilitate the delivery of the scrubber slurry to an upper portion of the wet scrubber and the mercury oxidizer is introduced to the scrubber slurry through the slurry recirculation line.

9. The method of claim 8 further comprising the step of improving elemental mercury removal by introducing a promoter into the scrubber slurry, wherein the promoter acts as a oxidizing agent for sulfite oxidation, and the promoter is introduced to the scrubber slurry though the slurry recirculation line.

10. The method of claim 9, further comprising the step of improving elemental mercury removal by introducing a complexing agent into the scrubber slurry, wherein the complexing agent bonds with the elemental mercury once oxidized and inhibits remission in an elemental form and wherein the complexing agent is introduced into the scrubber slurry through a slurry recirculation line.

11. The method of claim 8, wherein the wet scrubber further comprises a spray header and the spray header sprays the scrubber slurry into the wet scrubber thereby increasing the size of the gas-liquid interface.

12. The method of claim 11, wherein the wet scrubber further comprises a scrubber tray below the spray header and the mercury oxidizer has a reduction potential higher than about 0.851 eV.

13. The method of claim 9, wherein the wet scrubber further comprises a spray header and the spray header sprays the scrubber slurry into the wet scrubber thereby increasing the size of the gas-liquid interface.

14. The method of claim 13, wherein the wet scrubber further comprises a scrubber tray below the spray header, the mercury oxidizer has a reduction potential higher than about 0.851 V, and the promoter introduced has a reduction potential between about 0.172 V and about 0.851 V.

15. The method of claim 10, wherein the wet scrubber further comprises a spray header and the spray header sprays the scrubber slurry into the wet scrubber thereby increasing the size of the gas-liquid interface.

16. The method of claim 15, wherein the wet scrubber further comprises a scrubber tray below the spray header, the mercury oxidizer has a reduction potential higher than about 0.851 V, and the promoter introduced has a reduction potential between about 0.172 V and about 0.851 V.

17. A method for removing elemental mercury from flue gas in wet scrubber comprising the steps of:
providing a wet scrubber have a scrubber slurry;
providing a flue gas comprising a $SO_2$, a oxidized mercury, and a elemental mercury;
enabling the flue gas to pass through the scrubber;
introducing a mercury oxidizer, a promoter, and a complexing agent into the scrubber slurry,
oxidizing the elemental mercury with the mercury oxidizer at a gas-liquid interface of the flue gas and the scrubber slurry within the wet scrubber, and
precipitating the oxidized mercury out the scrubber slurry.

18. The method of claim 17 wherein the wet scrubber comprises a slurry spray header and the mercury oxidizer is introduced to the scrubber slurry at the spray header.

19. The method of claim 18 wherein the wet scrubber comprises a plurality of the slurry spray headers at different levels within the wet scrubber and each of the plurality of the spray headers is provided with the scrubber slurry comprising the mercury oxidizer.

20. The method of claim 18 wherein the wet scrubber comprises a plurality of the slurry spray headers at different levels and at least one of the plurality of the slurry spray headers is provided with the scrubber slurry.

* * * * *